United States Patent

[11] 3,573,805

[72] Inventor Leroy U. C. Kelling
    Waynesboro, Va.
[21] Appl. No. 709,387
[22] Filed Feb. 29, 1968
[45] Patented Apr. 6, 1971
[73] Assignee General Electric Company

[54] CONVERSION APPARATUS FOR CONVERTING NONSTANDARD PULSE COUNT TO STANDARD MEASUREMENT COUNT
5 Claims, 3 Drawing Figs.

[52] U.S. Cl. .................................................. 340/347,
    356/106, 328/38
[51] Int. Cl. ................................................ H03k 13/02,
    H04l 3/00
[50] Field of Search.......................................... 356/106;
    340/347

[56] References Cited
OTHER REFERENCES
OPTO mechanism Incorporated Instruction and Maintenance Manual 437L-512 Laser Interferometer - June 1966 page 6

*Primary Examiner*—Maynard R. Wilbur
*Assistant Examiner*—Jeremiah Glassman
*Attorneys*—Lawrence G. Norris, Michael Masnik, Stanley C. Corwin, Frank L. Neuhauser, Oscar B. Waddell and Melvin M. Goldenberg ABSTRACT: A digitally operable quantity measuring and conversion apparatus is described for deriving precise measurements in terms of recognized measurement units (such as inches or centimeters). The apparatus includes a measuring instrument such as an interferometer position gauging device which develops a number of direction indicating, fringe count pulsed waveform electric signals that are representative of the position of an equipment (such as the working head of a numerically controlled machine tool) being controlled measured with respect to a reference position. The measuring and conversion apparatus further includes digitally operable numerical processing means which preferably comprises a pulse rate multiplier including a reversible pulse rate reference counter. Direction logic circuits are provided for supplying the input pulses fringe count electric signal representative of the quantity (position) to be measured to the reversible pulse rate counter to cause it to count up or down in accordance with the direction information of the input pulsed electric signals. The conversion apparatus further includes pulse rate multiplier gates, and a conversion factor read in circuit for reading the value of a conversion factor to be multiplied into the pulse rate multiplier. The pulse rate multiplier gates are responsive to the output of the reversible pulse rate counter, the conversion factor read in circuit, and the direction logic circuit for providing at the output of the conversion apparatus a desired output summation signal representative of the summation of one incremental conversion factor value for each incremental input fringe count electric signal pulse, and hence representative of the product of the input fringe count pulses multiplied by the conversion factor. In preferred arrangements, conversion factor changing means are included as part of the conversion factor read-in circuit for changing the value of the conversion factor either manually or automatically in response to a change in operating conditions.

INVENTOR.
LEROY U. C. KELLING
BY Michael Masnik
HIS ATTORNEY

INVENTOR.
LEROY U. C. KELLING
BY Michael Masnik
HIS ATTORNEY

INVENTOR.
LEROY U. C. KELLING

CONVERSION APPARATUS FOR CONVERTING NONSTANDARD PULSE COUNT TO STANDARD MEASUREMENT COUNT

BACKGROUND OF INVENTION

1. Field of Invention

This invention relates to a new and improved measuring and conversion apparatus for converting a nonstandard signal pulse count into a count in standard measurement units.

More particularly, the invention relates to a digitally operable quantity measuring and conversion apparatus for receiving variable rate fringe count signal pulses derived from an interferometer position gauging device employed as the position feedback element of a numerically controlled machine tool, and for converting the input fringe count signal pulses into an output signal representative of a quantity (position) to be measured in terms of recognized measurement units such as inches or centimeters.

2. Description of Prior Art

A numerically controlled, machine tool, is an automatically controlled machine tool that employs digitized electronic signals to control the action of the working head (cutting element) of a machine tool relative to the workpiece in to describe a contoured or complicated cutting path on the workpiece. For a more detailed description of a numerically controlled machine tool, reference is made to U.S. Pat. No. 3,283,129 issued Nov. 1, 1966 for a Pulse Rate Multiplier For Control System, L.U.C. Kelling, inventor, assigned to the General Electric Company.

The known numerically controlled machine tools heretofore have employed as a position feedback signal generating device, position measuring devices, of either the resolver or Accupin-type which provide phase shifted, square wave shape electric signals representative of the position of the working element of the machine tool. While such position measuring units are adequate for many applications, there are a number of machine tool jobs wherein the tolerances allowed are much too close to acceptably employ the resolver or Accupin-type of position measuring unit. Because of this need, it has been proposed to employ an interferometer position gauging device for developing an extremely accurate, digitized position feedback signal for precisely locating the position of the working head of the machine tool. The machining operation in question may be either contouring or straight line machining to a point in space (such as is encountered in drill press operation, etc.) wherein it is desired to know within microinches (0.00001 inches), or perhaps tens of microinches, the precise location of the working head of the machine tool. The interferometer position gauging device provides such precise position locating information within the required accuracy.

The position measuring signal derived by an interferometer position gauging device, is developed through the use of a coherent light wave interference phenomenon wherein changes in the position of the working head of the machine results in changing the number of interference fringes produced at a detecting location due to the interaction of out-of-phase reflected and reference coherent light waves impinging on a detector disposed at the detecting location. As the working head of the machine tool changes location in response to numerical command signals supplied to it, the phase of the coherent light wave produced by the laser interferometer, and reflected from the working head so as to impinge on the detector, changes relative to the reference coherent light wave (produced by the same laser) to thereby produce interference fringe counts which are indicative of changes in position of the machine tool working head. The character of the interference fringe counts is such that movement of the machine tool head in one direction (measured along a defined axis) relative to a reference position produces one characteristic form of phase change interference fringe count pulse that is different from the characteristic form of phase change interference fringe count pulse produced for movement in an opposite direction from the reference position. Hence, the characteristic interference fringe count pulses can be used to indicate up-down or positive-negative movement of the working head of the machine tool relative to the reference position.

The spacing between the fringes (while constant for steady state ambient operating conditions) is in the form of an irrational or nonstandard count number that must be related to known measurement units. For example, if it is determined that for a given set of ambient operating conditions, the spacing between fringes is represented by fringe pulses produced by the interferometer having a pulse spacing of $3.1142697 \times 10^{16}$ inches, then the fringe count produced by the interferometer must be multiplied by this factor (or a similar factor for operation in the metric system) in order to convert the count into meaningful units of distance measurement such as inches or centimeters. To accomplish this measurement and conversion, the present invention was devised.

In addition to the above need for conversion into known measurement units, it should be noted that the spacing between the fringes produced by the interferometer position gauging device (while constant for steady state ambient operating conditions) may be subject to change due to changes in the ambient operating condition of the interferometer gauging device. To be particular, suppose that the laser interferometer position gauging device employs a red frequency laser that puts out light where one-eighth wavelength equals 0.0000031142697 inches. Depending upon the accuracy desired, the conversion apparatus of the invention can be made with a sufficient number of digits to get the desired accuracy. Normally six or seven digits are sufficient to get an accuracy of approximately one part in 100,000. If seven digits are used, then in effect the conversion apparatus will function to multiply each incoming laser interferometer fringe count pulse by a conversion factor of 0.3114270 to derive a desired output position count in 0.00001 inch increments representative of the position of the working element of the machine tool in standard measurement units. However, the wavelength of light in air changes markedly with changes in air pressure, temperature and humidity. Thus, the last three digits of the conversion factor employed must be readjusted as local conditions change. The measuring and conversion apparatus made available by the present invention also includes a means for changing the value of the conversion factor either manually or automatically in response to changes in operating conditions.

In addition to the above matters, it should be noted at this point that the conversion apparatus of the present invention is not limited to use for the conversion of fringe count pulses of an interferometer position gauging device, but may be employed in connection with any general conversion problem encountered by numerically controlled equipment wherein the term "numerically controlled equipment" is intended to include any digitally operable, numerically controlled apparatus such as a general purpose digital computer, machine tool readout for display, sensor or guidance control systems employing digitized signals, machine tool controls and the like. Also, this invention can be employed to change measurement units, as for example, from millimeters to inches.

SUMMARY OF INVENTION

It is therefore a primary object of the invention to provide a new and improved measurement and conversion apparatus for converting an input, i.e., pulsed electric signal, into an output signal indicative of a quantity to be measured in known measurement units such as inches or centimeters.

Another object of the invention is to provide a conversion apparatus of the above type which is especially adapted for use with an interferometer position gauging device of the type that develops direction indicating fringe count electric signal pulses that are representative of the up and down (forward or back) position movements of the working element of a numerically controlled machine tool measured with respect to a reference position. The conversion apparatus operates to multiply the input fringe count signal pulses by a known conversion factor having a value in known measurement units (microinches or micrometers) and representative of the space between fringes derived by the interferometer position gauging device.

Another object of this invention is to provide an improved signal processing arrangement.

A further object of the invention is the provision of a conversion apparatus having the above set forth capabilities wherein the value of the conversion factor may be readily changed either manually by an operator or automatically in response to changes in operating conditions of the measuring and converting apparatus.

In practicing the invention, a digitally operable quantity measuring and conversion apparatus is provided for driving precise measurements in terms of recognized measurement units and includes measuring means for developing a pulsed waveform electric signal representative of a quantity such as position desired to be measured. Digitally operable numerical processing means are also included which have one input coupled to the output of the measuring means and the remaining input connected to the output of a conversion factor read-in circuit for supplying a conversion factor value thereto. The numerical processing means serves to operate on the two input values to produce a digital output signal representative of the product of the two values to thereby provide an output indication of the quantity (position) to be measured in terms of recognized measurement units.

In preferred forms of the conversion apparatus, the numerical processing means includes digitally operable counter means for deriving an output summation signal representative of the summation of one incremental conversion factor value for each incremental input pulse waveform electric signal supplied from the measuring means. Since the input pulsed waveform electric signal representative of the quantity (position) to be measured is of positive and negative polarity measured with respect to a reference value, the digitally operable counter preferably comprises a reversible counter that counts up or down in response to the polarity of the input pulse waveform electric signal pulses and delivers at its output a summation signal representative of the net value of the number of input electric signal pulses multiplied by the value of the conversion factor.

In a preferred embodiment of the invention described in this application, the numerical processing means of the conversion apparatus comprises a pulse rate multiplier that includes a reversible pulse rate reference counter. Direction logic circuits are connected to the reversible pulse rate counter for supplying the input pulsed waveform electric signals representative of the quantity to be measured to the counter to cause it to count up or down in accordance with the polarity of the input electric signals. The apparatus further includes conversion factor read-in circuits and pulse rate multiplier gating circuits, with the pulse rate multiplier gating circuits being responsive to the reversible pulse rate counter, the conversion factor read-in circuits and the direction logic circuit for providing at the output of the conversion apparatus a desired output summation signal representative of the summation of one incremental conversion factor value for each incremental input pulse. It is also preferred that the conversion factor read-in circuits include means for changing the value of the conversion factor either manually or automatically in response to changes in operating conditions of the measuring and conversion apparatus.

BRIEF DESCRIPTION OF DRAWING

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENT

Figure 1:
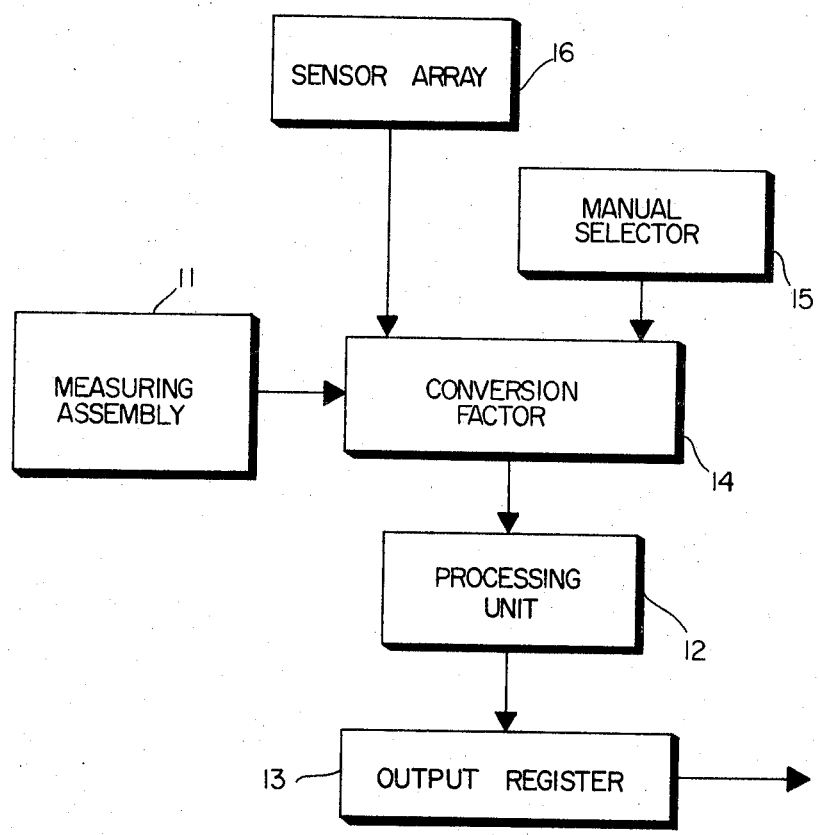
FIG. 1 is a functional block diagram of an overall measuring and conversion apparatus constructed in accordance with the invention.

FIG. 1 of the drawings is a functional block diagram of a new and improved digitally operable quantity measuring and conversion apparatus constructed in accordance with the invention. As is illustrated in FIG. 1, the measuring and conversion apparatus is comprised by a measuring assembly 11 that preferably constitutes a laser interferometer position gauging device for developing a pulsed waveform electric signal representative of a quantity (position) desired to be measured. The pulsed waveform electric signal developed by the measuring assembly 11 is supplied to a digitally operable numerical processing circuit means shown at 12 which converts the pulse count to known measurement units and supplies the converted count to an output register 13. The numerical processing circuit means 12 also has supplied to it a conversion factor value supplied from a conversion factor read-in circuit means 14. The conversion factor value supplied from the conversion factor read-in circuit means 14 may represent the value of the spacing that is known to exist between each set of two input pulses supplied from the measuring assembly 11. For example, the value of this spacing may be $3.1142697 \times 10^{16}$ inches in the event that the measuring assembly 11 is an interferometer gauging device employing a particular laser, as contemplated in accordance with the preferred embodiment of the invention. The numerical processing circuit means 12 then operates to multiply the value of the conversion factor times the number of input pulses supplied from the measuring assembly 11 to thereby derive an output signal count representative of the product of the two input valves. This output signal count then provides an indication of the quantity to be measured in terms of recognized measurement units, and is supplied to output register 13 where it may be accumulated for subsequent use by the numerically controlled equipment with which the measuring and conversion apparatus is used.

Depending upon the nature of the measuring assembly 11, it is possible for changes in the ambient operating conditions of this assembly to effect the spacing between the input pulses supplied to the numerical processing circuit means 12. For this reason, manually operable conversion factor changing means shown at 15 are provided to allow an operator of the apparatus to change the value of the conversion constant to conform to the new operating conditions. Alternatively, if desired, a sensor array 16 may be employed to automatically sense changes in the ambient operating conditions such as air pressure, temperature and humidity which might effect the operation of the measuring assembly 11, and to automatically change the value of the conversion factor supplied by the conversion factor read-in circuit means 14 in response to changes in the ambient operating conditions, etc.

In operation, the measuring assembly 11 which preferably comprises a laser interferometer position gauging device develops a series direction indicating fringe count pulses that are supplied to the numerical processing unit 12. Simultaneously, the numerical processing unit 12 is supplied with the value of a conversion constant which is representative of the spacing between each laser interferometer fringe, and hence representative of a corresponding position or distance measurement. The number of fringe lines that are produced per inch or per centimeter is never a convenient decimal multiplier such as $10 \times 10^{16}$, so some fractional decimal multiplier must be used such as 0.31142697 for standard ambient operating conditions. A similar conversion factor is required for operation in the metric system. The conversion factor read-in circuit means 14 acting in conjunction with the numerical processing unit 12 performs the required fractional decimal multiplier action needed to develop the desired output signal count representative of the product of the two input values, and hence representative of the position being measured in terms of recognized measurement units such as inches or centimeters. Because the least significant digits of the conversion factor value noted above for inches will change in response to changes in the ambient operating conditions, it is necessary to provide some means such as the manually operated control 15 or the sensor array 16 for either manually or automatically changing the values of the least significant digits of the conversion factor in response to changes in the operating conditions of the measurement and conversion apparatus.

From the foregoing description, it will be appreciated that the measuring and conversion apparatus made available by the invention provides a means for converting interferometer position gauging fringe line count pulses into pulse count units which are a decimal fractional part of an inch or a centimeter. It also includes means for adjusting the ratio between the fringe line count and the decimal unit count, as well as means for automatically changing the ratio command by automatic sensor means so as to make adjustments for changes in the wavelength of light with changes in temperature, air pressure and humidity.

Figure 2:
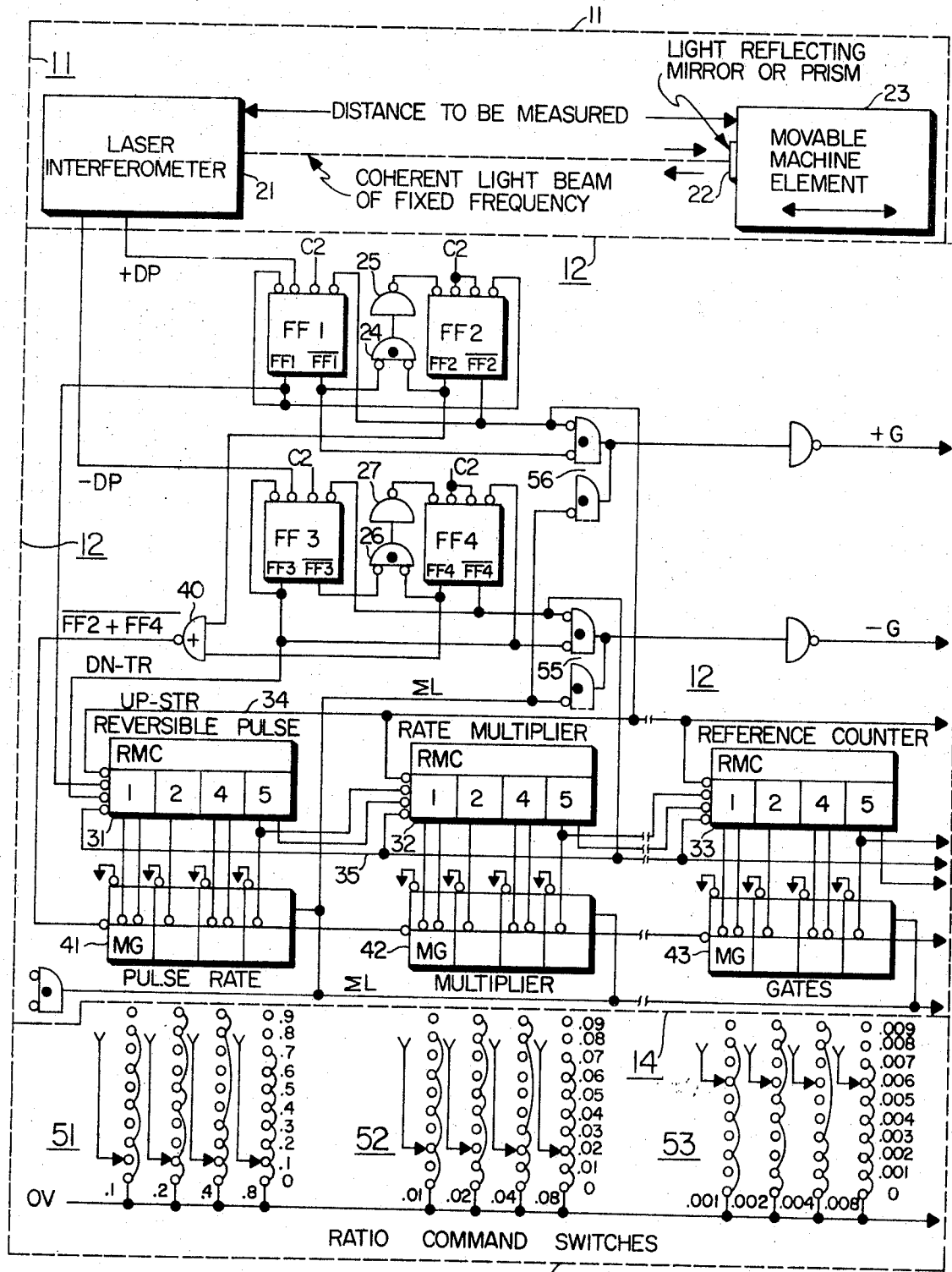
FIGS. 2 and 2A are detailed logical circuit diagrams of one known manner of constructing the measuring and conversion apparatus shown in FIG. 1, and which employs a pulse rate multiplier.

FIG. 2 of the drawings is a detailed logical circuit diagram of one suitable form of a conversion and measuring apparatus according to the invention which employs a reversible pulse rate multiplier as the numerical processing means thereof. The reversible pulse rate multiplier conversion apparatus shown in FIG. 2 incorporates a unique timing arrangement which permits the same set of pulse rate multiplier gates to be employed for counting pulses in both the upward and downward directions. It is of course possible to have a different set of pulse rate multiplier gates for each direction; however, an arrangement utilizing only a single set of multiplier gates for both the up and down direction is preferred because of its greater simplicity and overall economy.

In FIG. 2, the measuring assembly 11 is illustrated as comprising a conventional, commercially available laser interferometer position gauging device 21 which projects a coherent light beam onto a light reflecting element 22 such as a mirror or prism fixed to a moveable machine element 23 that may comprise the working head of a numerically controlled machine tool. The coherent light beam impinging on the light reflecting surface 22 is then reflected back to a detector comprising a part of the laser interferometer 21 where it interacts with a directly supplied reference coherent light beam to produce interference fringe counts that are indicative of changes in position of the moveable machine element 23. The laser interferometer 21 then operates to detect the interference fringe counts produced by the projected and reflected light beam as the distance to the reflected surface 22 changes, and produces output pulses for each fringe change cycle. The laser interferometer 21 produces an output of plus direction pulses (+DP) and minus direction pulses (−DP) for each fringe change in the up scale and down scale direction, respectively.

The directional pulses +DP and −DP are supplied to the input of the numerical processing means 12, and are applied directly to direction logic circuit means comprised by synchronizing flip-flops, FF1, FF2, FF3 and FF4. The flip-flops FF1 and FF2 are interconnected through a two input AND gate 24 and a power driver inverter 25 with the $\overline{FF1}$ terminal of flip-flop FF1, and the FF2 terminal of flip-flop FF2 being connected to the two input terminals of AND gate 24. AND gate 24 has its output terminal connected through the power driver inverter 25 to the set steering terminal of flip-flop FF2. The FF1 (set) output terminal of flip-flop FF1 is connected directly back to its set steering input terminal and is connected to the reset steering input terminal of flip-flop FF2.

The $\overline{FF2}$ (reset) output terminal of flip-flop FF2 is connected back to the reset steering input terminal of flip-flop FF1 and also serves to develop the gate signal $\overline{FF2}$ for steering the up-count gates of the reversible pulse rate multiplier reference counter to be described hereinafter. Input clock pulses C2 are applied to both trigger input terminals of flip-flop FF2, and to the reset trigger input terminal of flip-flop FF1. The set trigger input terminal of flip-flop FF1 is connected to the source of +DP input fringe count pulses supplied from laser interferometer 21. The flip-flops FF3 and FF4 are similarly interconnected through an AND gate 26 and power driver inverter 27 with the exception that the set trigger input terminal of flip-flop FF3 is connected to the −DP fringe count pulses supplied from laser interferometer 21. The interconnection of flip-flops FF1 through FF4 in this manner forms a pulse synchronizing circuit which causes the reversible pulse rate multiplier counter to count up or down by one count for each +DP or −DP fringe count pulse supplied from the laser interferometer as will be described more fully hereinafter.

For a more detailed description of the construction and operation of the flip-flops FF1 through FF4, the AND gates 24 and 26 which are inverting AND gates, and the power driver inverters 25 and 27, reference is made to any of the standard texts on the design of logical circuits. For example, see the textbook entitled "Logical Design of Digital Computers" by Montgomery Phister, author, John Wiley Publishing Company or the text entitled "Design of Transistorized Circuits for Digital Computers" by Abraham I. Pressman, John F. Rider Publishing Company, Inc. of New York, 1959. A more detailed description of these logic circuit elements also may be found in U.S. Pat. No. 3,120,603 issued Feb. 4, 1964 for "An Automatic Control Apparatus" J.E. Jones, inventor assigned to the General Electric Company. In connection with these logical circuit elements, it may be well to note that in the logical circuit shown in FIG. 2, the logic value or state 0 as used hereinafter implies that a positive voltage is present on the indicated lead. Conversely, the logic value 1 implies that a zero or reference voltage is present on the indicated lead. This notation is consistent with the practice described more fully in the text on logic switching and design by Kiester, Ritchie and Washburn entitled "The Design of Switching Circuits" D. Van Nostrand and Company, publishers, 1951. In this convention, the term "Pulse Present" means that the logic state on the lead in question has switched from logic level 1 to logic level 0. If there has been no change in state, or the change has been a change from logic level 0 to a logic level 1, then it is considered that there is no pulse present or a "pulse absent" condition.

Figure 2A:
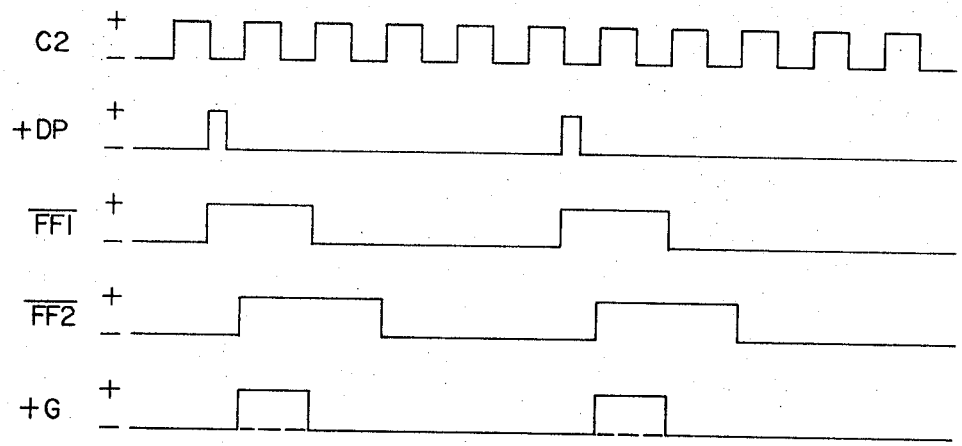
Figure 2A:
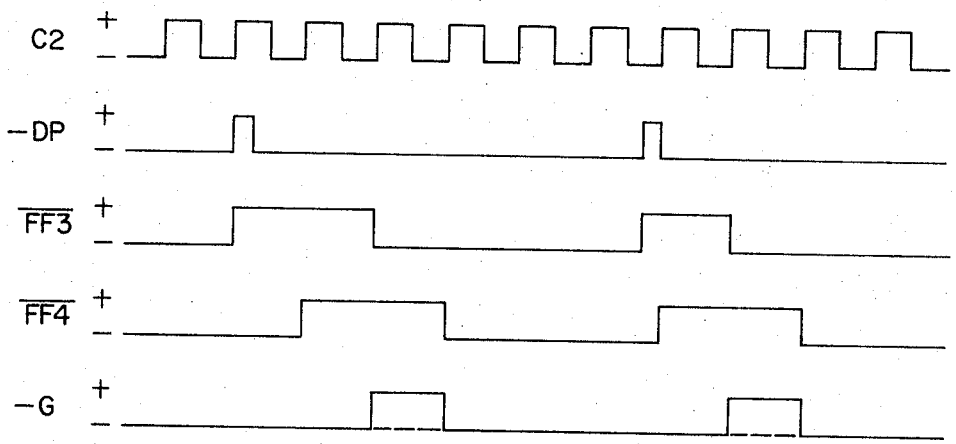

The timing charts shown in FIG. 2A (1) and FIG. 2A (2) illustrate the nature of the signal generated by the pulse synchronizing flip-flops FF1 through FF4 when the ratio command switches (to be described further hereinafter) are set at a maximum ratio of 0.99999/1.0000. The operation of the synchronizing flip-flops is based on an assumption that the laser interferometer spaces all of its output signals (succeeding like or unlike sign) by more than the operating cycle of the pulse synchronizing flip-flops. If this assumption is not true, then faster pulse sequencing circuits can be inserted between the laser interferometer and the pulse synchronizing flip-flop FF1 through FF4.

The pulse synchronizing flip-flops generate the gate signal $\overline{FF2}$ and $\overline{FF4}$ for steering the up and down gates respectively of a reversible, three decade pulse rate multiplier reference counter shown at 31, 32 and 33. Each of the counters 31, through 33 comprises one decade of a three decade reversible counter the detailed construction and operation of which is described more fully in the above-referenced published literature and patents. These up and down steering signals identified as UP–STR and DN–STR are supplied over the conductors 34 and 35, respectively. The pulse synchronizing flip-flops also generate the up and down count trigger pulses FF1 and FF3 that are supplied as the UP–TR and DN–TR input trigger pulses to the trigger inputs of the first decade reversible counter 31. The arrangement of the pulse synchronizing flip-flop is such that they generate steering signals which persist before and after the trigger signal so as to allow an adequate time for the counting action of the reversible counter. As stated previously, the overall effect of the pulse synchronizing flip-flops is to cause the reversible pulse rate multiplier counter 31, 32 and 33 to count up or count down by one count for each input ±DP or −DP fringe count pulse supplied from laser interferometer 21.

The FF2 output and FF4 output from the synchronizing flip-flops are supplied through a two input OR gate 40 which derives an output $\overline{FF2}+\overline{FF4}$ summation signal that is supplied to all of the pulse rate multiplier gates 41, 42, 43 that correspond to each decade of the three decade reversible counters 31, 32 and 33 for reading out the gated comparison of conversion factor numbers and the count accumulated in the counter.

The pulse rate multiplier gates 41, 42 and 43 also have inputs connected to the outputs of the stepping switches of a three decade ratio command stepping switch arrangement shown at 51, 52 and 53, and which correspond to the three decades of the reversible counter. The ratio command switches 51, 52 and 53 comprise the conversion factor read-in circuit means for setting into the pulse rate multiplier the desired value of the conversion constant to be multiplied by the number of input fringe count pulses supplied from laser interferometer 21. As a consequence, the ratio command switches have been enclosed in the dotted outline box and identified with the reference numeral 14 to show its relation to the overall system illustrated in FIG. 1. The stepping contacts of the ratio command switches 51 through 53 may be set either manually by an operator, or may be selectively stepped in accordance with the output from an automatic measuring instrument arrangement such as that shown at 16 in FIG. 1 in order to change the value of the conversion constant automatically in response to changes in the operating condition of the laser interferometer. For a number of installations, however, it will be adequate to provide an operator of the conversion apparatus with suitable measuring instrumentation which he can read visually, and then manually set the ratio command switches to the desired values to correspond to the then existing operating conditions.

In operation, the application of the summation signal $\overline{FF2}+\overline{FF4}$ to the input of the pulse rate multiplier gates 41 through 43 causes the pulse rate multiplier gates to produce out an output signal on the summation line indicated at ΣL whenever the state of the pulse rate multiplier reference counter 31 through 33 corresponds to the conversion factor command numbers set into the ratio command switches 51 through 53. For a more detailed description of the construction and operation of the pulse rate multiplier gates, and the manner in which they derive the desired read-out signals on the summation line ΣL, reference is made to the above-identified issued U.S. Pat. Nos. 3,283,129 and 3,120,603, and to an article entitled "Inside the Mark Century Numerical Control" by Evans and Kelling appearing the Control Engineering, Volume 10, No. 5, May 1963, pages 112 through 117.

The outputs from the pulse rate multiplier gates appearing on the summation line ΣL are supplied to respective input terminals of two extended three input AND gates 55 and 56, respectively included in the synchronizing circuits comprised by flip-flops FF1—FF4. The extended three input AND gate 55 has one input terminal connected to summation line $\overline{\Sigma L}$ and its remaining two input terminals connected to the $\overline{FF4}$ output of flip-flop FF4 and to the FF3 output of flip-flop FF3 respectively. Similarly, the extended three input AND gate 56 has one input terminal connected to summation line ΣL and its remaining two input terminals connected to the $\overline{FF2}$ output of flip-flop FF2, and to the $\overline{FF1}$ output of flip-flop FF1, respectively.

With the above arrangement, the pulse synchronizing flip-flops FF1—FF4 will operate to sort out the outputs from the pulse rate multiplier gates in accordance with the direction pulses +DP and −DP initially received from laser interferometer 21. In counting up scale, the AND gates 56 will provide output (+G) pulses during intervals before the reversible counter counts up scale, and in counting down scale, the lower gates 55 will provide output (−G) pulses in the interval following the change in state of the reversible counter. This switching of the sampling time dependent upon the direction of the input fringe count pulses makes it possible to use only one set of multiplier gates 41 through 43 for both up scale and down scale counting, and makes the overall conversion apparatus simpler to construct, and reducing reversing errors. Of course, it is possible to provide a different set of gates for each direction. The (+G) and the (−G) output pulses may then be supplied as gate signals along with a C2 clock signal to an output register such as that shown at 13 which could comprise a second reversible counter. This is preferable to supplying the (+G) and (−G) output pulses as separate pulses because the operating time of the counter and the gates might otherwise lead to temporary false output signals while the reference counter was changing state.

Depending upon the accuracy desired, the pulse rate multiplier arrangement shown in FIG. 2 can be made with a sufficient number of digits to provide the desired precision. Normally, six or seven digits are required to obtain an accuracy of approximately one part in 100,000. If seven digits are used, and the conversion factor value is initially assumed to be $3.114269 \times 10^{16}$ inches, then the successive decade ratio command switches are set at commands of 3114269. As stated previously, the wavelength of light in air changes markedly for changes in air pressure, temperature and humidity. Thus, it will be necessary to adjust at least the values of the last three of the seven digits as local conditions change. This can be done manually by an operator of the apparatus, or if circumstances require it, the change may be effected automatically in response to an array of sensing instruments indicated at 16 in FIG. 1.

For maximum measuring accuracy, the ratio command switches shown at 51, 52 and 53 could be replaced with a reversible counter which includes an automatic control to increase or decrease the conversion factor value properly as the wavelength of light changes due to changes in air pressure, air temperature or humidity and the like. In order to avoid a timing problem involving simultaneous command change of conversion factor value and pulse signals from the laser interferometer, the conversion apparatus can easily be arranged to change the conversion factor values only during periods when the pulse rate multiplier is working with the more significant digits. This can be readily accomplished since only the least significant conversion factor digits are changed. Further, if no large change in value of the conversion factor is required, then the first three or four decades of the pulse rate multiplier command can be permanently wired to the values that would otherwise be obtained from ratio command switches.

While the conversion apparatus of the invention has been described specifically in connection with a laser interferometer position gauging device, the conversion apparatus is by no means limited to use with such a position gauging device. The inclusion of the conversion factor changing capability renders the conversion apparatus useable, for example, to make parts that are slightly over or slightly under size with respect to a given reference size, or to correct for workpiece temperatures, or to build scale models within the limits of the available members. Another prospective application for the conversion apparatus would be in circumstances where a hot article can be measured and it is desired to convert the hot measurement dimensions to corresponding cold measurement dimensions prior to cooling the article in order to determine whether or not the cooled article will be within prescribed tolerances. Still another application of the novel conversion apparatus would be in the conversion of finished part data to pattern measurements for producing wooded patterns to be used in molding, etc., operations.

It will be appreciated from the foregoing description that the invention provides a new and improved measurement and conversion apparatus for converting an input pulsed electric signal into an output signal indicative of a quantity to be measured in known measurement units such as inches or centimeters. The conversion apparatus is especially adapted for use with an interferometer position gauging device of the type that develops direction indicating fringe count electric signal pulses which are representative of the up and down (forward or back) position movements of a numerically controlled machine tool measured with respect to a reference position. The conversion apparatus operates to multiply the input fringe count signal pulses by a known conversion factor in known measurement units (microinches or micrometers) representative of the space between the fringes derived by the interferometer position gauging device. With the particular conversion apparatus described, it is possible to change the value of the conversion factor either manually by an operator or automatically in response to changes in operating conditions of the measuring and converting apparatus to thereby adapt the apparatus to a wide number of uses.

Having described one embodiment of a new and improved measuring and conversion apparatus constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

I claim:

1. In combination, a reversible pulse rate multiplier comprising a reference counter, multiplier gates, and a multiplier command signal channel, an output circuit, a source of first and second sampling recurrent pulses, countup recurrent pulses and countdown recurrent pulses, means for applying either of said sampling recurrent pulses to said multiplier gates, means for applying either of said countup and countdown recurrent pulses to said reference counter to provide an instantaneous counter state signal, said multiplier gates responsive to said counter state signal, said applied sampling recurrent pulses and said multiplier command signals to develop pulses at said output circuit constituting a percentage of the recurrent pulses applied to said reference counter as determined by the multiplier command signals stored in said multiplier command channel, said developed output pulses constituting countup output pulses when the recurrent pulses applied to said reference counter are countup pulses, said provided output pulses constituting countdown output pulses when recurrent pulses applied to said reference counter are said countdown pulses, means for minimizing errors in said developed output pulses arising from changing from a countup to a countdown operation comprising means for causing said gates to respond to applied sampling recurrent pulses before the reference counter responds to countup recurrent pulses during countup operation, means for causing said reference counter to respond to applied countdown recurrent pulses before said multiplier gates respond to applied sampling recurrent pulses during countdown operation.

2. An arrangement according to claim 1 comprising means for summing the produced countup and countdown output pulses.

3. An arrangement for converting bidirectional input pulses each representing unit quantities in a first dimensional system into bidirectional output pulses each representing unit quantities in a second dimensional system comprising; a reversible counter, a single set of multiplier gating means, a source of digital input signals representing the digital ratio of a conversion factor, means for algebraically summing said bidirectional input pulses in said reversible counter to provide a sum representation in the states of the elements associated with said counter, said multiplier gating means coupled to said reversible counter and said source of input signals for providing output pulses for some of the input pulses as selected by said gating means in response to certain combinations of the states of the elements of said reference counter relative to said digital input signals, means for rendering said arrangement completely reversible over any pattern of input pulses without loss or gain of output pulses comprising means responsive to said input pulses for selecting the generated output pulses of said multiplier gates before the change of state of said reference counter for input pulses of a first direction and after the change of state of said reference counter for input pulses of the opposite direction.

4. An arrangement according to claim 3 wherein the polarity of each output pulse is the same polarity as that of the input pulse which is converted to such each output pulse.

5. An arrangement for converting bidirectional input pulses each representing unit quantities in a first dimensional system into bidirectional output pulses each representing unit quantities in a second dimensional system comprising; a reversible counter having elements whose states represent the instantaneous count stored in said counter, a single set of multiplier gates, a source of digital input signals representing a multiplying factor, means for algebraically summing said bidirectional input pulses in said reversible counter to provide a sum representation in the states of the elements associated with said counter, said multiplier gates coupled to said reversible counter and responsive to said input signals for providing a number of output pulses equal to the number of input pulses corresponding to said sum representation multiplied by said multiplying factor, means for minimizing errors in said provided output pulses comprising means for selecting the provided output pulses of said multiplier gates before the change of state of said reference counter for input pulses of a first direction and after the change of state of said reference counter for input pulses of the second or opposite direction.